(12) United States Patent
Lovelace

(10) Patent No.: US 10,901,801 B2
(45) Date of Patent: Jan. 26, 2021

(54) DISTRIBUTED MONITORING OF NETWORK COMPUTERS FOR DYNAMICALLY UPDATING ASSIGNMENTS OF TASKS

(71) Applicant: Gunnar Lovelace, Santa Monica, CA (US)

(72) Inventor: Gunnar Lovelace, Santa Monica, CA (US)

(*) Notice: Subject to any disclaimer, the term of this patent is extended or adjusted under 35 U.S.C. 154(b) by 0 days.

(21) Appl. No.: 16/580,999

(22) Filed: Sep. 24, 2019

(65) Prior Publication Data

US 2020/0097332 A1    Mar. 26, 2020

Related U.S. Application Data

(60) Provisional application No. 62/736,078, filed on Sep. 25, 2018.

(51) Int. Cl.
| | | |
|---|---|---|
| *G06F 9/50* | (2006.01) | |
| *G06F 11/34* | (2006.01) | |
| *G06F 11/30* | (2006.01) | |
| *G06F 21/54* | (2013.01) | |
| *H04L 29/08* | (2006.01) | |

(52) U.S. Cl.
CPC .......... *G06F 9/5072* (2013.01); *G06F 9/5027* (2013.01); *G06F 9/5083* (2013.01); *G06F 11/3006* (2013.01); *G06F 11/3409* (2013.01); *G06F 21/54* (2013.01); *H04L 67/10* (2013.01); *G06F 2209/503* (2013.01)

(58) Field of Classification Search
CPC .... G06F 9/5027; G06F 9/5072; G06F 9/5083; G06F 21/54; G06F 2209/503; H04L 67/10
See application file for complete search history.

(56) References Cited

U.S. PATENT DOCUMENTS

| | | | |
|---|---|---|---|
| 9,122,765 B1 | 9/2015 | Chen | |
| 2003/0120544 A1* | 6/2003 | Gritzbach | G06Q 30/0225 705/14.26 |
| 2006/0106675 A1* | 5/2006 | Cohen | G06Q 30/0601 705/26.1 |
| 2009/0063413 A1* | 3/2009 | Lee | G06Q 10/06 |
| 2013/0297655 A1* | 11/2013 | Narasayya | G06F 11/3457 707/791 |
| 2015/0007185 A1* | 1/2015 | Dey | G06F 9/4843 718/102 |
| 2016/0275617 A1* | 9/2016 | Brocado | G06Q 40/06 |

OTHER PUBLICATIONS

U.S. Appl. No. 16/653,260, filed Oct. 15, 2019.

(Continued)

*Primary Examiner* — Thomas J Dailey
(74) *Attorney, Agent, or Firm* — Vierra Magen Marcus LLP

(57) ABSTRACT

A system performs distributed monitoring of network computers for dynamically updating assignment of tasks. The network computers are assigned tasks to perform. The network computers include monitoring software that automatically monitors performance in the background to identify functions performed (other than the assigned tasks). New tasks are configured for the network computers based on the functions performed.

17 Claims, 5 Drawing Sheets

(56) References Cited

OTHER PUBLICATIONS

International Search Report & The Written Opinion of the International Searching Authority dated Jan. 2, 2020, International Application No. PCT/US2019/053001.

Wikipedia, "Hash table," Retrieved from the Internet, [https://en.wikipedia.org/w/index.php?title=Hash_table&oldid=858867029], on Dec. 2, 2019, 17 pages.

Postgresql, "The Statistic Collector," Retrieved from the Internet, [https://web.archive.org/web/20180309055344/https://www.postgresql.org/docs/9.3/static/monitoring-stats.html], on Dec. 3, 2019, 12 pages.

* cited by examiner

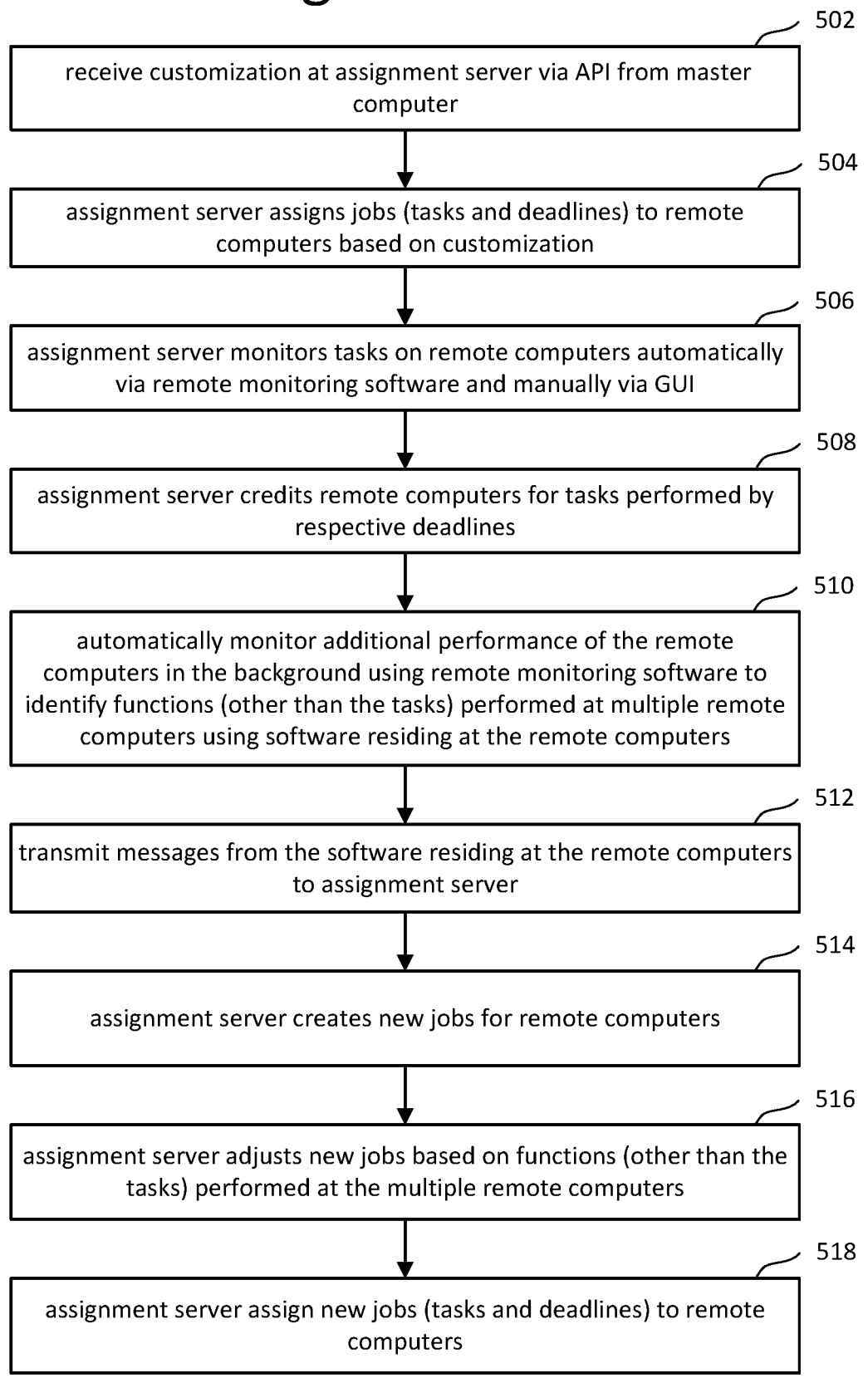

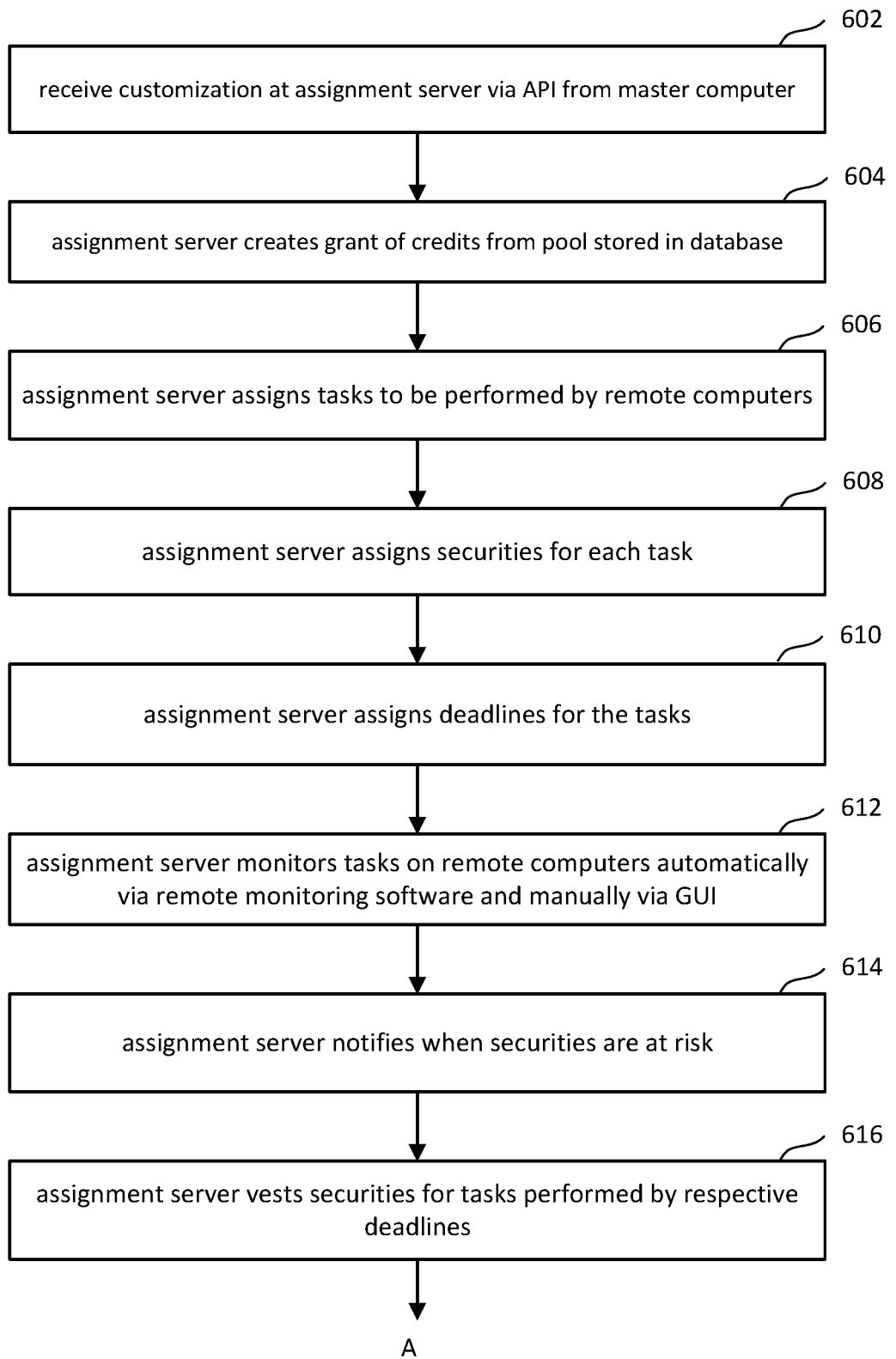

DISTRIBUTED MONITORING OF NETWORK COMPUTERS FOR DYNAMICALLY UPDATING ASSIGNMENTS OF TASKS

PRIORITY CLAIM

This application claims priority to U.S. Provisional Application No. 62/736,078, filed Sep. 25, 2018, which is incorporated herein by reference in its entirety.

BACKGROUND

Distributed processing refers to a variety of computer systems that use more than one computer to performs tasks. In some cases, the computers of the distributed processing system may not function at the same level of performance. Often, a task is assigned without taking into account the performance of the computer to which the task is assigned. In a system in which computers are distributed geographically and communicate via the Internet, it may be challenging to make sure each computer is operating at optimal efficiency and performance.

BRIEF DESCRIPTION OF THE DRAWINGS

Like-numbered elements refer to common components in the different figures.

FIG. 5 is a flow chart describing one embodiment of a process for distributed monitoring of network computers for dynamically updating assignments of tasks.

FIGS. 6A and 6B together are a flow chart describing one embodiment of a process for distributed monitoring of network computers for dynamically updating assignments of tasks.

DETAILED DESCRIPTION

A system performs distributed monitoring of network computers for dynamically updating assignments of tasks. The network computers are assigned tasks to perform. The network computers include monitoring software that automatically monitors performance in the background to identify functions performed (other than the assigned tasks). New tasks are configured for the network computers based on the functions performed by the network computers. This configuration allows the distributed computing system to operate more efficiently and at higher performance.

Figure 1:
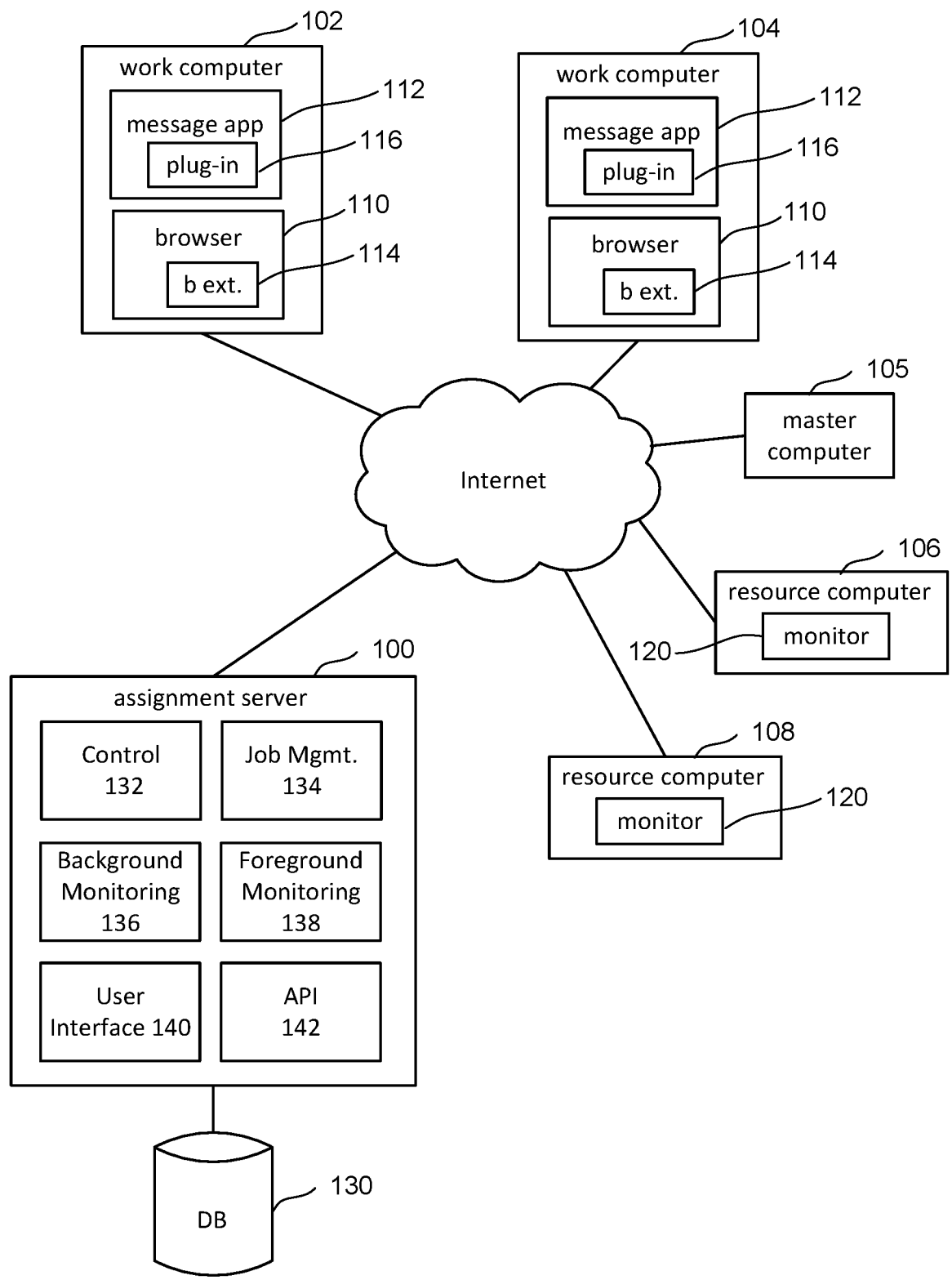
FIG. 1 is a block diagram of a processing system that implements the technology proposed herein.

FIG. 1 provides one example of a system that performs distributive monitoring of network computers by dynamically updating assignments of tasks to computers. The system of FIG. 1 includes assignment server 100, work computer 102, work computer 104, master computer 105, resource computer 106 and resource computer 108, all of which are connected to the Internet so that they can communicate with each other. Although FIG. 1 shows two work computers 102 and 104, it is contemplated that the system can have more than two work computers. Although FIG. 1 shows two resource computers 106 and 108, it is contemplated that the system could include more than two resource computers. Work computer 102, work computer 104, resource computer 106, and resource computer 108 are remote from assignment server 100 and, therefore, are referred to as remote computers.

Assignment server 100 assigns tasks to work computer 102 and work computer 104. Master computer 105 can be thought of as a customer of assignment server 100 and acts to configure and authorize assignment server 102 to assign tasks to work computer 102 and 104. Resource computer 106 and resource computer 108 provide network resources to work computer 102 and work computer 104. Network resources are anything that can be accessed via a network including a server, database, software as a service (SaaS), website, social networking site, e-commerce site, etc.

Each of assignment server 100, work computer 102, work computer 104, master computer 105, resource computer 106 and resource computer 108 include a processor (one or more cores), network interface (e.g., Ethernet and/or WiFi), persistent storage (e.g. hard disk drive and/or solid state drive), memory, and other peripherals all connected together via a bus or other structure. Software (i.e., processor readable code) stored in the persistent storage and/or the memory can be used to program the processor to perform the methods/processes described below.

Work computer 102 and work computer 104 are assigned tasks to be performed. Each work computer includes a set of programs used to perform the tasks and software embedded in the work computer for monitoring performance. Two examples of software used to perform tasks include browser 110 and message application 112. Examples of browser 110 include Safari, Explorer, Chrome, Firefox, etc. Examples of message applications include email applications, instant messaging applications and other types of message applications. The monitoring software can include a browser extension 114 (also referred to as a plug-in) which is used to provide additional functionality to a browser and can be used to monitor everything performed within the browser. The monitoring software can also include plug-in 116 for the message application 112. Other software being used on work computer 102 can include its own monitoring software. Additionally, the work computers can also include a software application that is not a plug-in, but does monitor one or more other applications. In an alternative embodiment, work computers 102 and 104 can include one software application for monitoring multiple applications.

Resource computers 106 and 108 also include monitoring software 120 for monitoring behavior of work computers 102 and 104 on those resource computers 106 and 108. For example, if resource computer 106 provides a social networking site, monitor software 120 can be used to monitor the actions taken by work computer 102 on the social networking site. In one embodiment, monitoring software 120 resides on resource computer 106. In another embodiment, monitor software 120 resides on work computer 102 or on another computer.

In one embodiment, assignment server 100 includes multiple software modules for performing various tasks, including control module 132, job management module 134, background monitoring module 136, foreground monitoring module 138, user interface module 140 and API module 142. Control module 132 includes software for performing control over the various tasks performed by assignment server 100. Job management module 134 creates and assigns tasks to work computers 102 and 104. Job management module 134 also updates the assignment of tasks based on the monitoring, as explained below. Background monitoring module 136 monitors tasks performed by work computers 102 and 104 in the background other than the tasks assigned by job management module 134. Background monitoring module 136 communicates with and receives updates from browser extension 114, plug-in 116 and monitor 120. Foreground monitoring module 138 monitors the tasks performed by work computer 102 and 104 that were assigned by job management module 134. User interface 140 provides a user interface for an entity operating assignment server 100 or any of the work computers 102/104. For example, user interface module 140 can provide a webpage. API 142 is an application programming interface that allows master computer 105 to access and configure job management module 134 to create a customized set of tasks to assign to work computer 102 and work computer 104.

Figure 2:
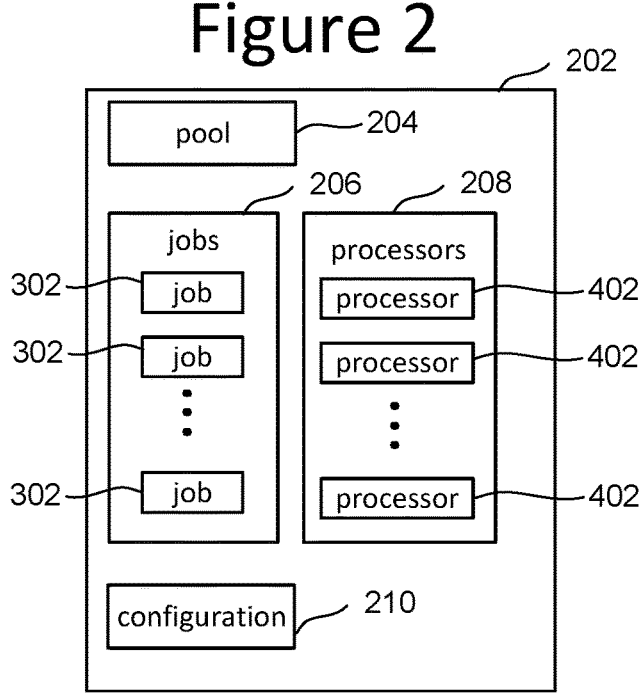
FIG. 2 is a block diagram describing one embodiment of a database (or other data structure).

Assignment server 100 includes (or at least has access to) database 130 which stores data used to provide tasks to the work computers and monitor the performance of the work computers. FIG. 2 shows an example of data 202 stored in database 130. In one example embodiment, data 202 includes a pool of securities 204, a plurality of jobs 206, a plurality of processor records 208 and configuration information 210. In one example implementation, entities can award securities to any of the work computers for performing tasks. An entity that issues securities in the entity can be the same entity that awards securities in the entity, or alternatively, a first entity that issues securities in the first entity can differ from a second entity that awards securities in the first entity. These securities are stored in pool 204, which can also be referred a pool of securities 204, or as a securities pool 204. For purposes of this document, securities can include any proof of ownership or debt that has been assigned a value and may be sold. Evidence of ownership is likely to be a computer file, but it can also be a written piece of paper. For the holder, a security represents an investment as an owner, creditor or rights to ownership on which the person hopes to gain profit. Examples are stocks, bonds and options. The term "security" can also mean any note, stock, treasury stock, bond, debenture, certificate of interest or participation in any profit-sharing agreement or in any oil, gas, or other mineral royalty or lease, any collateral-trust certificate, preorganization certificate or subscription, transferable share, investment contract, voting-trust certificate, certificate of deposit, for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a "security;" or any certificate of interest or participation in, temporary or interim certificate for, receipt for, or warrant or right to subscribe to or purchase, any of the foregoing.

Figure 3:
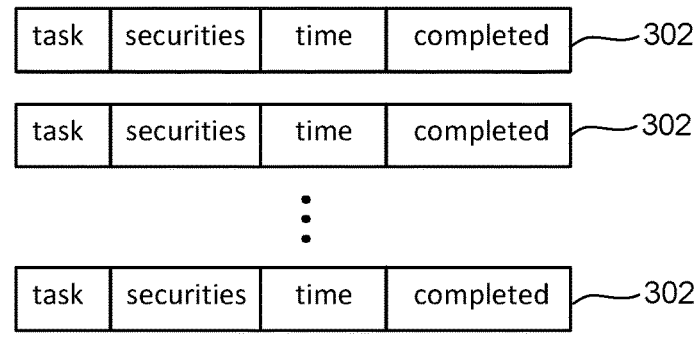
FIG. 3 depicts an example of a job record in the database.

Assignment server 100 manages jobs 206 which include a plurality of job records (job). FIG. 3 shows the contents of one example of a job record 302 which identifies a task, securities associated with a task, time information indicating the deadline for performing the task, and an indication where the task was completed.

Figure 4:
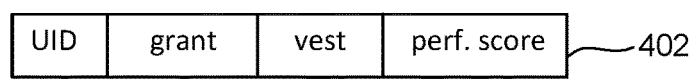
FIG. 4 depicts an example of a processor record in the database.

Database 202 also includes a plurality of processor records 208. FIG. 4 shows more details of a single processor record 402, which include a unique ID (UID), an indication of how many securities have been granted, an indication of how many securities have vested, and a performance score based on a background monitoring.

FIG. 5 is a flowchart describing one embodiment of a process for distributed monitoring of network computers to dynamically update assignment of tasks to those computers.

The process of FIG. 5 is an example of the operation of the components of FIG. 1. In step 502 of FIG. 5, assignment server 100 receives customization information from master computer 105 via API 142. This customization information is stored in configuration data 210 (see FIG. 2). In step 504, assignment server 100 assigns jobs to remote computers based on the customization. The jobs (see FIG. 3) includes tasks, securities for those tasks, and deadlines for when the tasks need to be completed by. In one embodiment, master computer 105 defines the tasks for the jobs via API 142 and that information is stored in configuration data 210. The remote computers include the work computers 102 and 104 and the resource computers 106 and 108. In one embodiment, the jobs are assigned to the work computers 102 and 104 (as well as any other work computers that are included in the system). In step 506, assignment server 100 monitors the tasks being performed on the remote computers automatically via remote monitoring software (e.g. browser extension 114 and plug in 116) and/or manually via a web page created by a user interface 140. That is, a user of any of the work computers can operate the work computer (using the browser 110) to access a webpage that includes a graphical user interface for reporting back to assignment server 100 what tasks have been completed and how they have been completed. In step 508, assignment server securities the remote computers for tasks performed by the respective deadlines. As discussed above, in some embodiments, a job includes tasks and securities for performing those tasks. If the task is successfully performed, the associated securities are assigned to the relevant work computers that performed the tasks. In other embodiments, the securities can be assigned to a user account on the work computer. In step 508, when assignment server 100 credits securities to a remote computer (e.g., work computer 102) for performing a task, the appropriate "completed" field in the job record 302 (see FIG. 3) is adjusted to indicate that the job has been completed.

In step 510, the monitoring software on the remote computer automatically monitors additional performance of the work computers to identify functions (other than the task assigned in step 504) performed at the remote computers using software residing at the remote computers. That is, software on the work computers (e.g. browser extension 114 and plug in 116) can monitor behavior of work computers 102 and 104. Additionally, monitoring software 120 can monitor behavior of work computers 102 and 104 on resource computers 106 and 108 (e.g. monitor a user of the work computer posting on a social media site). In step 512, messages are transmitted from the monitoring software residing on the remote computers to the assignment server 100. These messages are sent electronically via the Internet. The message can be sent via email, text message, TCP/IP, or other proprietary messaging protocols.

In step 514, assignment server 100 creates new jobs (e.g., task) for the remote computers. For example, assignment server 100 can create new jobs for work computers 102 and 104 based on configuration from master computer 105 that was stored in configuration data 210. Those new jobs include tasks, securities for those tasks, and deadlines for completing the tasks (see FIG. 3). In step 516, assignment server 100 adjusts those new jobs created in step 514 based on the functions performed at the multiple computers. As discussed above, step 510 includes monitoring the behavior of the remote computers. The results of that monitoring is/are used to adjust the new jobs created. The functions for which the adjusting is based on is not the performance of the tasks in the jobs. Rather, the functions for which the adjusting is based can be other behavior. For example, if a task assigned as part of a job is to perform a computational analysis, an example of the function monitored in step 510 and used to adjust another job in step 516 could be sending out communications, performing other computations, running other applications, etc. In step 518, assignment server 100 assigns the new jobs (after being adjusted) to the appropriate remote computers (e.g. the appropriate work computers 102 and/or 104).

In one embodiment, an entity can initially award users (e.g., a work computer or an entity operating a work computer) with grants of securities to drive specific actions. As those actions (e.g., tasks) are performed, those securities vest to the user. If the actions are not performed by the indicated deadline, then the securities are returned back to the pool. While this is happening, background monitoring is performed to see how the entities behave (in addition to performing the tasks). That background monitoring is used to create new sets of jobs for the entities. The new sets of jobs include tasks, securities and deadlines for performing those tasks in order to get the securities, with the task, securities and deadlines being adjusted based on the monitored behavior. More details are described below. An entity (aka user) that is operating a work computer (e.g., 102 or 104) can be provided with access, e.g., via a graphical user interface (GUI) provided by plug-in 112 and/or 114, to a respective account that specifies the type and/or quantity of securities that have been granted to the entity. For example, a first quantity of securities may have already vested to the entity, while a second quantity of securities may be returned back to the pool if certain actions are not performed by an indicated deadline. The securities that may be returned to the pool, which have not yet vested, can be referred to herein as reserved securities or reserved units, since they are reserved for the entity so long as the entity performs certain actions by an indicated deadline.

In one example implementation, securities are used to drive behavior. For example, the goal could be to use customer behavior to increase the awareness of or value of a specific service or product. Companies can initially grant a set of securities to drive specific behavior. Those securities are tied to a set of tasks and deadlines for performing those tasks. Examples of tasks include testing a beta version of a product or service; downloading an application; installing an application; registering a product or service; encouraging friends to use a product of service; and continued use of a product (e.g., making a purchase, becoming a member, depositing money, transferring value to a friend, etc.). Initially, the customer would not own the securities underlying the grant but would earn the securities over time by engaging in the behavior that allows the customer (aka user) to earn the underlying equity. If the customer fails to engage in the task by the deadline, those securities will decay and be returned to the pool. Concurrently, the customer's behavior is monitored. Based on that behavior, additional sets of tasks can be assigned and/or adjusted, as described herein. This embodiment is described in more detail with respect to FIGS. 6A and 6B.

Figure 6B:
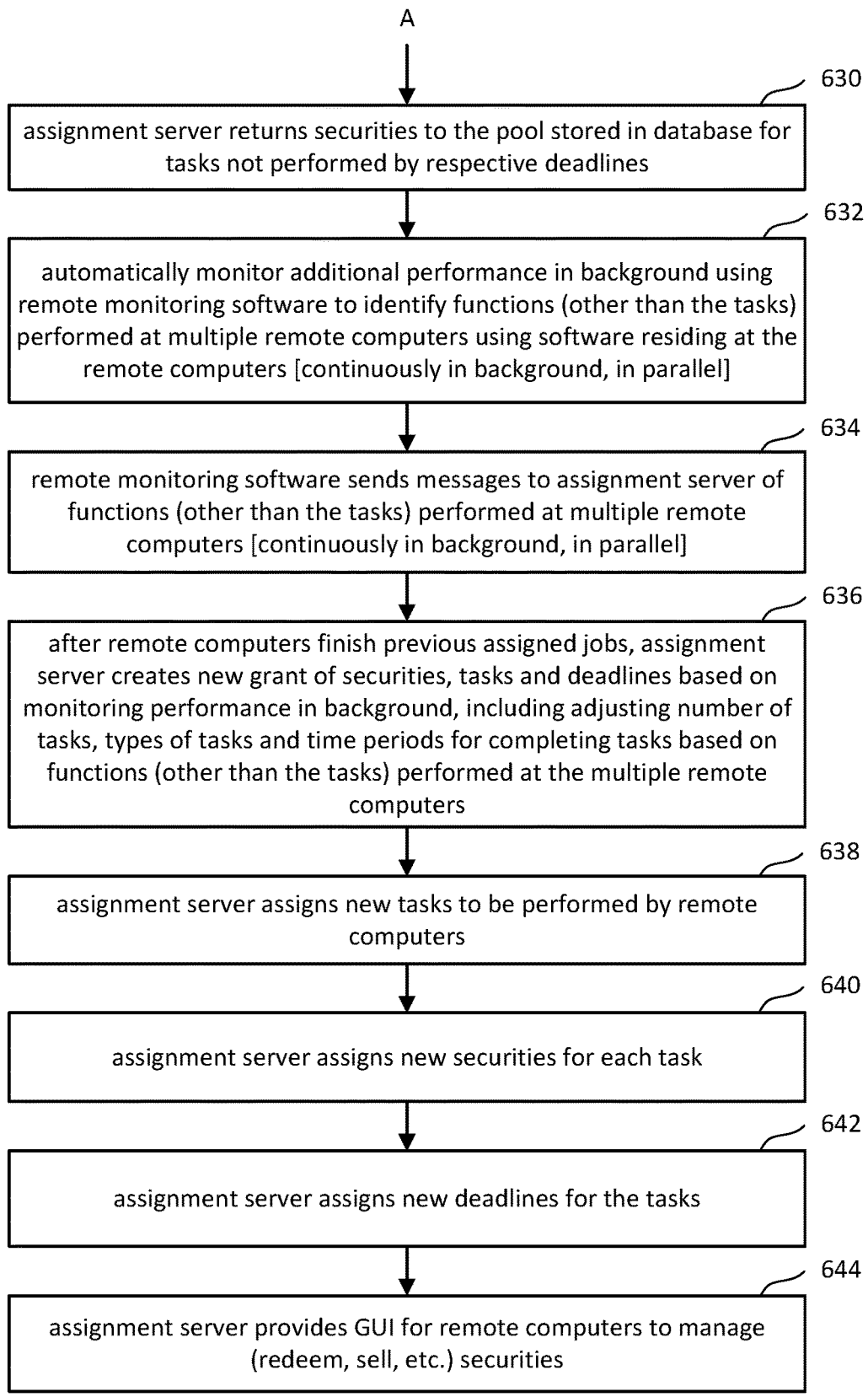

FIGS. 6A and 6B together are a flowchart describing an example implementation of the process of FIG. 5 that pertains to using securities to drive behavior, as discussed above. In step 602, assignment server receives customization via API 142 from master computer 105. Step 602 is similar to step 502 of FIG. 5. In step 604, assignment server 100 creates a grant of securities from pool 204 stored in database 130. In step 606, assignment server 100 assigns tasks to be performed by the remote computers. For example, one or more tasks can be assigned to work computer 102 and/or work computer 104. In step 608, assignment server 100 assigns securities for each task. In step 610, assignment server assigns deadlines for each task. The task, securities and deadlines can be sent to the work computers via a user interface, API, email, text message or a proprietary messaging format. In one embodiment, steps 604-610 are example implementations of step 504 of FIG. 5.

In step 612, assignment server 100 monitors tasks on the remote computers automatically via remote monitoring software and manually via a graphical user interface. Step 612 is similar to step 506 of FIG. 5. In step 614, assignment server 100 notifies the appropriate work computer when securities for a job are at risk because the corresponding task has not been completed and it is close to the deadline. In step 616, assignment server vests securities for any task performed and completed by the respective deadlines. This includes marking the "completed field" of record 302 of FIG. 3. In step 630 (see FIG. 6B), assignment server 100 returns securities to pool 204 for tasks not performed by the respective deadlines. Steps 616 and 630 are example performance of step 508 of FIG. 5.

Step 632 includes automatically monitoring additional performance in the background using remote monitoring software to identify functions (other than the tasks previously assigned) that are performed at multiple remote computers using software residing at the remote computers. Step 632 is performed continuously in the background and in parallel to the other steps described herein. Step 632 is similar to step 510 of FIG. 5. In step 634, the remote monitoring software (e.g., monitoring software 120, browser extension 114, plug in 116, etc.) sends one or more messages to assignment server 100 indicating the functions (other than the tasks) performed at the multiple remote computers. Step 634 is performed continuously in the background and in parallel to the steps described herein. Step 634 is an example implementation of step 512.

In step 636, after the remote computer has finished a previous assigned job, assignment server 100 creates new grants of securities, new tasks and new deadlines (e.g., assignment server creates new jobs) based on the monitored performance in the background, including adjusting the number of tasks, types of tasks and time periods for completing the task based on the functions (other than the tasks) performed at the multiple remote computers. Step 636 of FIG. 6B is analogous to steps 514 and 516 of FIG. 5. In one example, the monitoring of step 632 includes looking for customers who actively use a product or service, purchase a product or service, promote or otherwise refer to a product or service in social media, hold onto securities (or other equity) for long periods of time, or other actions. In step 638, assignment server 100 assigns the new tasks to be performed by the remote computers. In step 640, assignment server 100 assigns the new securities for each task to the remote computers. In step 642, assignment server 102 assigned the new deadlines for each task to the remote computers.

Note that assignment server 100 provides a graphical user interface for the remote computers (e.g. the work computers 102/104) to manage (redeem, sell, etc.) the securities it has received (step 644). Step 644 can be performed at any time.

Consider the following example. A customer gets a grant of 500 tokens on day one. The tasks associated with that grant of tokens (e.g., securities) includes 100 tokens when the customer registers on the platform, 100 tokens for signing a petition, 100 tokens for a social media post, and 100 tokens for referring a friend. The customer has 30 days to complete each activity. Thirty days after the grant date, if the customer has not registered, 100 tokens are returned to the pool. Sixty days after the grant date, if the customer has not signed a Petition, another 100 tokens are returned to the pool, etc. This allows the administrator to make vesting and decay automatic functions within the system.

In some of the above-described embodiments, the assignment server 100 sets up a schedule for completing tasks and vesting or losing securities. In another embodiment, the assignment server 100 assigns a set of tasks and securities for those tasks, without creating a schedule for completing tasks and vesting or losing securities. In such an embodiment without the schedule, assignment server 100 uses an algorithm (that can be customized by master computer 105) for vesting securities to work computers and returning securities from work computers based on performance of the assigned tasks by the work computers.

The assignment server securities algorithm tracks and scores the various behaviors of work computers interfacing with the master computer. The algorithm is used to determine the rules and conditions that a work computer is subject to earning or losing securities when interacting with the master computer's product or service. The algorithm is dynamically controlled with an administrative graphical user interface (GUI) on the assignment server 100 that allows the master computer to toggle the weighting impact of a given action taken by the work computer. This allows for master computer 105 to customize the algorithmic control and scoring of the work computer behaviors over time so that assignment computer 100 can decay (subtract) or appreciate (add) securities taken or given to a work computer.

The algorithm scores work computers on interactions and transactions with the master computer's (105) product or service that include (but are not limited to): frequency of interactions or transactions, types of interactions or transactions, time actually spent interacting with master computer's product or service, transaction sizes, length of time between periods of interaction or transaction periods, number of new work computers referred by an existing work computer, the length of time work computer holds securities in master computer, how quickly a work computer sells securities in a work computer, what proportion of securities in master computer that are held by the work computer are sold or transferred, how quickly a work computer earns or loses securities in the master computer over a series of transactions and interactions with master computer product or service, positive or negative reviews of work computer by peer work computers in the ecosystem of the master computer (via direct product and service or 3rd party channels), positive or negative peer reviews of other work computers of contributions made by work computer.

Scoring of a work computer is stored on assignment server 100 and can be kept private or made public depending on upon the master computer's selected preferences via the administrative GUI on their master computer account. This score can be represented and visualized as a number, badge, ranking or otherwise. The algorithm can be customized by the master computer 105 to reward or penalize velocity of earning, losing, selling, transferring of securities to form the programmatic basis for the work computer to earn or lose even more securities.

The assignment server 100 provides customizable securities reporting to the master computer 105 on work computers participating in the master computer's product or service. This reporting allows for the master computer 105 to segment cohort behaviors of various segments of work computers in a GUI that can be exported or connected via API to other database formats. Such reporting will show things like (but not limited to): how many securities have been earned or lost over variable periods of time and work computer segment types, respective scores of work computers, the increase or decrease of securities and/or score of work computers. The master computer can configure various levels of user access by other master computers (administrators with various levels of control and access). The master computer GUI allows for dynamic modification and update of the User Agreement, Terms of Service or Securities rules and rules earned that work computers are bound by in holding Securities earned or lost. The administrator of the assignment server 100 and/or master computer 105 can determine whether any modifications of a User Agreement, Terms of Service or Securities rules will be displayed to a work computer, require acknowledgement or approval of the work computer. The assignment server 100 has various levels of administrative sub accounts with customizable control on global behaviors and rules across the entire network. The administrator of the assignment server 100 can increase or reduce the control of an administrator of the master computer's account over the securities and scoring rules for all participating work computers in the master computer's account and database.

Consider an example in which master computer 105 defines the assignment server 100 via a GUI (graphical user interface) with ten behaviors that they want to positively score a work computer along with three behaviors that negative score the work computer. Work computers 102/104 are scored for how frequently or infrequently they engage in the behaviors so that the assignment server algorithm knows how many securities to give to the work computer depending on how active they are. Inversely, the algorithm will decay (subtract) securities (i.e. return the securities to pool 204) for how a work computer performs or doesn't perform certain defined tasks.

The above-described technology allows the distributed computing system (e.g., the system of FIG. 1) to operate more efficiently and with higher performance as the various computers/entities are given tasks and securities in proportion to their performance.

One embodiment includes a distributed computational system, comprising: a plurality of remote computers including work computers and resource computers, the work computers configured to performed tasks and functions, the resource computers are configured to provided network resources, the remote computers include monitoring software that automatically monitors performance of the work computers in the background to identify functions other than tasks performed at remote computers by work computers; a database; and an assignment server in communication with the remote computers and the database, the assignment server configured to assigns tasks and deadlines to a work computer, monitor the tasks on the work computers, credit the work computer for tasks performed by respective deadlines, receive messages from the monitoring software indicating functions other than tasks performed at remote computers by work computers, create a new job for the work computers after the work computer finishes a previous assigned jobs, adjust the new job based on functions other than the tasks performed at the multiple remote computers as indicated by the messages, and assign the new job to the work computer.

One embodiment includes a non-transitory processor readable storage medium, comprising processor readable code that programs one or more processors to perform a method comprising: receiving customization via an API;

assigning jobs (tasks and deadlines) to remote computers based on the customization; monitoring tasks on remote computers automatically via remote monitoring software; crediting remote computers for tasks performed by respective deadlines; receiving messages from software residing at the remote computers indicating functions other than the tasks performed at multiple remote computers using software residing at the remote computers; creating new jobs for remote computers; adjusting the new jobs based on functions performed at the multiple remote computers; and assigning new job to the remote computers.

One embodiment includes a method for customer reward gamification, comprising: granting securities from a pool stored in a database; assigning tasks to be performed; assigns securities for each task; assigns deadlines for the tasks; monitoring the tasks; vesting securities for tasks performed by respective deadlines; returning securities to the pool stored in database for tasks not performed by respective deadlines; automatically and continuously monitoring additional performance in background using remote monitoring software to identify functions other than the tasks using software residing at remote computers; creating new grant of securities, tasks and deadlines based on the monitoring additional performance, including adjusting number of tasks, types of tasks and time periods for completing tasks based on functions performed; and assigning the new tasks, securities for the new tasks and deadlines for the new tasks.

One embodiment includes a non-transitory computer-readable software medium including a program product for causing a server to realize functions to control the dissemination of rewards or the implementation of consequences. The functions include, a starting function configured to offer a reward or grant to a platform participant, an ongoing automated algorithmic function that can toggled by a Master Admin and Customer Admin which scores the behavior of the participant and distributes rewards or causes rewards to decay/appreciate over time based on that score, a function that maintains and aggregate score for each participant over time and that adjusts future awards based on that aggregate score.

One embodiment includes a networked system for generating rewards for platform participants configured to use an algorithmic approach to developing a player activity score that forms the basis of an automated method of allowing participants to either earn the full amount of the reward or lose it as a result of decay. The automated system is configured to generating a plurality of rules for detecting lapses in player activities or increases in player activities that results in modifications of the player's activity score over time. This score causes the system to adjust future rewards based on historical behavior and can be used by players across multiple platforms.

One embodiment includes a distributed computational system, comprising a plurality of remote computers including work computers and resource computers, the work computers are configured to performed tasks and functions, the resource computers are configured to provided network resources, the remote computers include monitoring software that automatically monitors performance of the work computers in the background to identify functions other than tasks performed at remote computers by work computers; a database; and an assignment server in communication with the remote computers and the database, the assignment server configured to assigns tasks and securities to a work computer, monitor the tasks on the work computers, receive messages from the monitoring software indicating functions other than tasks performed at remote computers by work computers, vest and return securities for the work computers based on behavior of the work computers in response to the messages.

One example includes a software system, database and algorithm for distributing, rewarding and gamifying active customers of a product or service using grants of compensatory securities. This system was developed to automate a two step process (i) the initial grant or issuance of securities and (ii) the automated determination of the number of those granted or issued securities which are earned or lost over time based on the application of a behavior scoring algorithm.

For purposes of this document, a "computer" is a device for storing and/or processing data. A computer can include a desktop computer, a laptop computer, a server, a smartphone, a smart watch, a smart appliance, and any other machine that stores or processes data.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects. For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A method for customer reward gamification, comprising:
   maintaining a pool of securities stored in a database;
   assigning tasks to be performed;
   assigning securities for each task, prior to performance of the respective task, from the pool of securities stored in the database, the assigned securities are reserved;
   assigning deadlines for the tasks;
   monitoring performance of the tasks after the assigning securities;

after the monitoring of performance, vesting previously assigned but not vested securities for tasks performed by respective deadlines;
after the monitoring of performance, returning previously assigned but not yet vested securities to the pool of securities stored in the database for tasks not performed by respective deadlines;
automatically and continuously monitoring additional performance in background using remote monitoring software to identify functions other than the tasks using software residing at remote computers;
creating new grants of securities, tasks and deadlines based on the monitoring additional performance, including adjusting at least one of number of tasks, types of tasks and time periods for completing tasks based on functions performed; and
assigning the new tasks, securities for the new tasks and deadlines for the new tasks.

2. The method of claim 1, wherein the tasks are performed by computing machines, the method further comprising:
notifying one of the computing machines that securities for a task to be performed by that computing machine are at risk because the task to be performed by that computing machine has not been completed and it is close to the corresponding deadline.

3. The method of claim 1, further comprising:
decaying over time previously assigned but not vested securities for tasks not yet completed.

4. The method of claim 1, further comprising:
scoring behavior associated with performance of the tasks; and
decaying over time previously assigned but not vested securities based on the scoring.

5. The method of claim 1, wherein:
the maintaining the pool of securities stored in the database comprises maintaining different types of securities in the pool of securities stored in the database.

6. The method of claim 1, wherein:
the maintaining the pool of securities stored in the database, assigning tasks to be performed, assigning securities for each task, assigning deadlines for the tasks, vesting and returning are performed by an assignment server in communication with remote computers and the database; and
the remote computers are configured to perform the tasks.

7. The method of claim 6, wherein:
the remote computers include monitoring software that performs the monitoring of performance of the remote computers, the monitoring software is in communication with the assignment server.

8. The method of claim 6, further comprising:
the assignment server adjusting one of the new tasks by changing an amount of time allowed for completing the one of the new tasks.

9. The method of claim 6, further comprising:
the assignment server notifying one of the remote computers that securities for a task to be performed by that remote computer are at risk because the task to be performed by that remote computer has not been completed and it is close to the corresponding deadline.

10. The method of claim 6, further comprising:
the assignment server scoring behavior of at least one remote computer associated with performance of the tasks; and
the assignment server decaying over time previously assigned but not vested securities associated with the at least one remote computer based on the scoring.

11. A method for customer reward gamification, comprising:
maintaining a pool of securities stored in a database;
assigning tasks to be performed to computing machines;
assigning securities for each task, prior to performance of the respective task, from the pool of securities stored in a database;
assigning deadlines for the tasks;
monitoring performance of the tasks after the assigning securities;
after the monitoring of performance, vesting previously assigned but not vested securities for tasks performed by respective deadlines;
notifying one of the computing machines that securities for a task to be performed by that computing machine are at risk because the task to be performed by that computing machine has not been completed and it is close to the corresponding deadline; and
after the monitoring of performance, returning previously assigned but not yet vested securities to the pool of securities stored in the database for tasks not performed by respective deadlines.

12. A method for customer reward gamification, comprising:
maintaining a pool of securities stored in a database;
assigning tasks to be performed;
assigning securities for each task, prior to performance of the respective task, from the pool of securities stored in a database, the assigned securities are reserved;
assigning deadlines for the tasks;
monitoring performance of the tasks after the assigning securities;
decaying over time previously assigned but not vested securities for a task not yet completed; and
after the monitoring of performance, vesting previously assigned but not vested securities for tasks performed by respective deadlines.

13. The method of claim 12, further comprising:
scoring behavior associated with performance of the tasks, the decaying over time is based on the scoring.

14. A method for customer reward gamification, comprising:
maintaining a pool of securities stored in a database;
assigning tasks to be performed;
assigning securities for each task, prior to performance of the respective task, from the pool of securities stored in a database, the assigned securities are reserved;
assigning deadlines for the tasks;
monitoring performance of the tasks after the assigning securities;
after the monitoring of performance, vesting previously assigned but not vested securities for tasks performed by respective deadlines; and
after the monitoring of performance, returning previously assigned but not yet vested securities to the pool of securities stored in the database for tasks not performed by respective deadlines.

15. The method of claim 14, wherein:
the maintaining the pool of securities stored in the database, assigning tasks to be performed, assigning securities for each task, assigning deadlines for the tasks, vesting and returning are performed by an assignment server in communication with remote computers and the database; and
the remote computers are configured to performed the tasks.

16. The method of claim 15, further comprising:
the assignment server notifying one of the remote computers that securities for a task to be performed by that remote computer are at risk because the task to be performed by that remote computer has not been completed and it is close to the corresponding deadline.

17. The method of claim 15, further comprising:
the assignment server decaying over time previously assigned but not vested securities associated with the at least one remote computer.

* * * * *